(No Model.)
W. RENNYSON.
MACHINE FOR MIXING MORTAR.
No. 530,654. Patented Dec. 11, 1894.
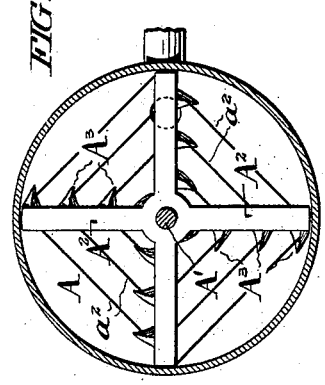
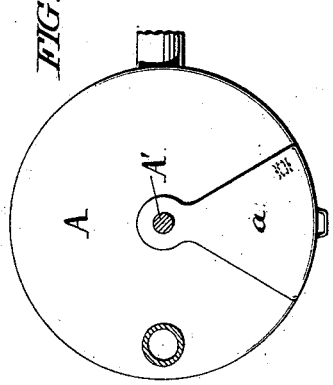
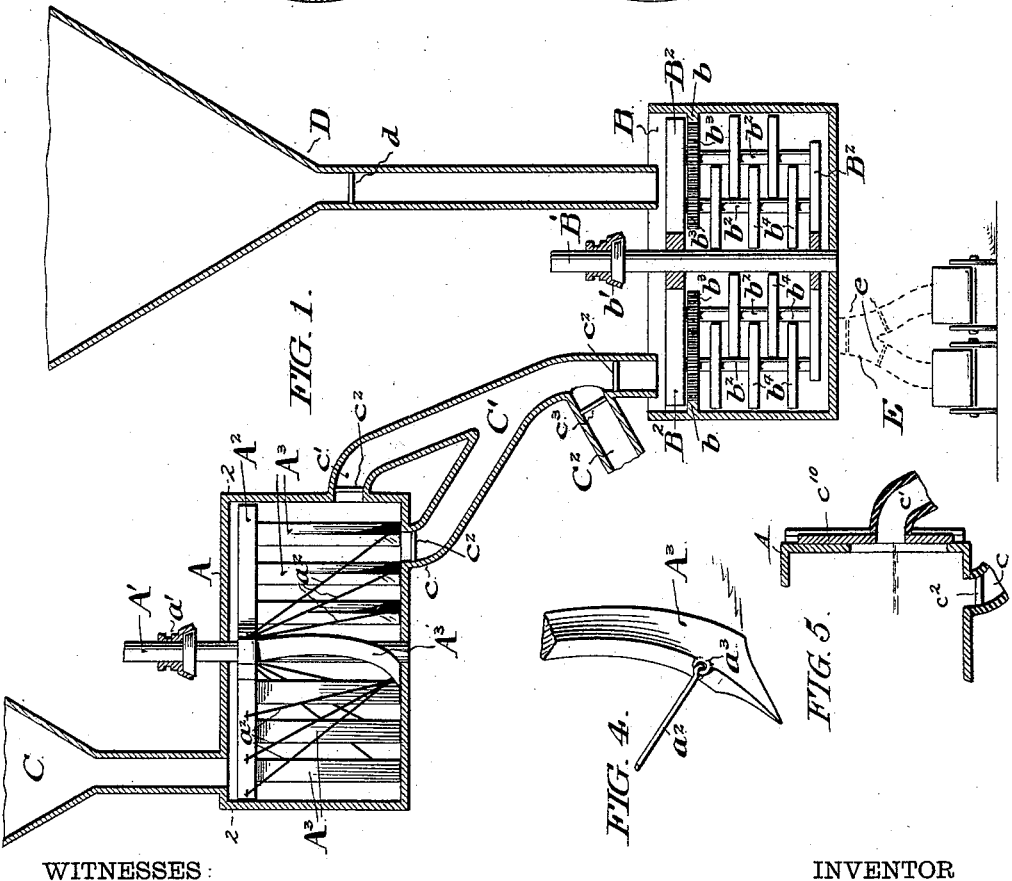
WITNESSES:
Harry Y. Davis.
L. P. Hollingsworth
INVENTOR
WILLIAM RENNYSON
by his attorney
Arthur W. Harrison

UNITED STATES PATENT OFFICE.

WILLIAM RENNYSON, OF NORRISTOWN, PENNSYLVANIA.

MACHINE FOR MIXING MORTAR.

SPECIFICATION forming part of Letters Patent No. 530,654, dated December 11, 1894.

Application filed April 21, 1894. Serial No. 508,551. (No model.)

*To all whom it may concern:*

Be it known that I, WILLIAM RENNYSON, of Norristown, in the county of Montgomery and State of Pennsylvania, have invented new and useful Improvements in Mortar-Mixing Machines; and I do hereby declare the following to be a full, clear, and exact description of said invention, reference being had to the accompanying drawings, and to the letters of reference marked thereon, which form a part of this specification.

My invention relates to machines for mixing mortar, and the main object of my invention is the production of a machine of exceeding simplicity, with hoes or plows for turning the lime while slaking so that the water is placed in direct and immediate contact with all of it, and thus quickly and completely slake it, at a minimum expenditure of power and time.

My improvements also embrace means for rapidly and systematically mixing the slaked lime with sand and hair or other material used for making mortar, or with a cement or binding material. I do this when the lime is hot by taking it immediately from the slaker to the mixer, and there mingling it with the other material; or I can take it from the slaker by gravitation to a proper place for storage, or it may be pumped to a suitable place, and there kept until a convenient time for mixing it.

My invention consists in the construction and combination of parts substantially as hereinafter described and claimed.

In the accompanying drawings Figure 1 is a sectional elevation of my complete apparatus. Fig. 2 is a sectional view of the slaker, on line 2—2 of Fig. 1. Fig. 3 is a plan view of the slaker. Fig. 4 is a perspective detail of the lower end of one of the plows or stirrers. Fig. 5 is a detail section hereinafter referred to.

Similar reference letters indicate the same parts in the several views.

A is the casing of the slaker, having a laterally swinging cover $a$, as shown in Fig. 3. Through the top of the casing extends a shaft A' which is preferably in two parts adapted to be connected and disconnected by any suitable clutch as indicated at $a'$, and the end of the shaft within the casing is provided with radial arms $A^2$ each having a series of plows or stirring blades $A^3$ depending therefrom. Near the lower end of each stirring blade is an eye $a^3$ which is connected by a link $a^2$ with the radial arm $A^2$ next in front of it.

The stirring blades or plows are extended forward at their lower ends to take under and turn over the lime, and the links $a^2$ serve to prevent the bending backward of said blades which would result in their binding on the floor of the casing. Thus the lower ends of said blades may be arranged very close to said floor, without risk of binding.

Any suitable connection may be made for the supply of water to the slaker.

B is the mixer casing or tank open at the top, and having a shaft B' provided with a clutch $b'$, similar to shaft A' and clutch $a'$ above described. This shaft B' is provided with two pairs of radial arms $B^2$ extending therefrom in opposite directions near the upper part and the bottom of the casing or tank, and each pair of arms has bearings for two parallel vertical shafts $b^2$ provided with stirring blades or paddles $b^4$. The upper end of each shaft $b^2$ has a pinion $b^3$, the pinions of the two shafts in each pair of arms meshing together, while the pinion of each outer shaft $b^2$ meshes with an internal gear or rack $b$ secured to or integral with the tank near its upper edge.

As will be readily understood, rotation of shaft B' and arms $B^2$ will cause the stirrers $b^4$ to rotate on the axes of the shafts $b^2$ and about the axis of the shaft B', thus thoroughly mixing the elements contained in the tank.

C indicates a hopper to lead lime from a suitable source of supply to the slaker, and C' a conduit from said slaker to the mixer, said conduit being preferably bifurcated at its upper end, with one branch connected with the bottom of the slaker at $c$ and the other branch connected with the side thereof at $c'$, whereby slaked lime of different consistency may be taken therefrom.

At $c^2$ are indicated suitable valves in the conduit, such as slide valves.

Near the lower end of the conduit is a branch $C^2$ leading outside the edge of tank B whereby the lime may be lead to a storage place, or a receiver for transportation to such storage place. This branch is provided with a valve $c^3$.

D is a hopper (or it may be the sand bin itself) for supplying sand or other material, such as cement to the mixer, and $d$ is a valve therefor.

The parts described will be supported on framework of any suitable kind, not shown, such as the floors of a building, with space below the mixer for the passage of trucks of any preferred kind.

At E is indicated, by dotted lines, a bifurcated conduit, having valves $e$, for conveying the mixed mortar to the trucks.

As shown in Figs. 1 and 3, the top of the slaker casing is air-tight except at the entrance of hopper C thereto and at this point the body of lime in the hopper will prevent access of air.

The conduit C' may be of flexible material and the upper branch connected to a slide $c^{10}$ on the side of the slaker casing so as to be moved up or down to take out the slaked lime to any desired depth, as illustrated in Fig. 5.

Having now described my invention, what I claim is—

1. A mortar mixing machine, comprising in its construction a lime slaker, a mixing tank located below the level of the slaker, and a valved conduit leading from one to the other, the connection of said conduit with the slaker being at the bottom thereof and also at the side above the bottom, substantially as described.

2. A mortar mixing machine comprising in its construction a lime slaker, a mixing tank located below the level of the slaker, a conduit having its upper end branched, one of said branches being connected to the bottom of the slaker and the other branch to the side thereof, the lower end of said conduit terminating above or within the mixer and having a branch terminating outside thereof, and a valve for each branch of the conduit, substantially as described.

3. A mortar mixing machine, comprising in its construction a lime slaker and a mixing tank below the level thereof, a valved conduit from one to the other, having its upper end branched and connected with the side and bottom of the slaker, a vertical shaft in the slaker and in the mixer, each shaft having stirring blades, and means such as clutches for connecting or disconnecting the shafts with operating means, substantially as described.

In testimony whereof I affix my signature in presence of two subscribing witnesses.

WILLIAM RENNYSON.

Witnesses:
   EUGENE D. EGBERT,
   GEO. W. GROFF.